(12) United States Patent
Parenteau

(10) Patent No.: US 7,284,733 B2
(45) Date of Patent: Oct. 23, 2007

(54) APPARATUS AND METHOD FOR LIFTING AND SUPPORTING A UTENSIL COVER

(76) Inventor: Christopher Eugene Parenteau, 19420 Fenway Ave. North, Forest Lake, MN (US) 55025

( * ) Notice: Subject to any disclaimer, the term of this patent is extended or adjusted under 35 U.S.C. 154(b) by 554 days.

(21) Appl. No.: 10/821,452

(22) Filed: Apr. 9, 2004

(65) Prior Publication Data

US 2004/0187698 A1    Sep. 30, 2004

Related U.S. Application Data

(63) Continuation-in-part of application No. 10/322,016, filed on Dec. 17, 2002, now Pat. No. 6,763,965.

(51) Int. Cl.
*B65D 43/26* (2006.01)
(52) U.S. Cl. ............... 248/213.2; 220/263; 248/213.1
(58) Field of Classification Search ............... D7/629, D7/688; 99/407, 409–410; 220/845–846, 220/263, 546; 248/213.1–213.2, 125.8, 205.5, 248/206.1, 206.3; 49/160, 158
See application file for complete search history.

(56) References Cited

U.S. PATENT DOCUMENTS

| 4,197,796 | A | * | 4/1980 | Salatka | .................. 100/293 |
| 4,921,119 | A | * | 5/1990 | Goad et al. | .................. 220/212 |
| D357,557 | S | * | 4/1995 | Piper | .................. D30/133 |
| 6,361,004 | B1 | * | 3/2002 | Witherspoon | .................. 248/213.2 |
| 6,763,965 | B2 | * | 7/2004 | Parenteau | .................. 220/263 |
| 2003/0183633 | A1 | * | 10/2003 | Pope | .................. 220/263 |

* cited by examiner

*Primary Examiner*—Anthony Stashick
*Assistant Examiner*—Christopher McKinley
(74) *Attorney, Agent, or Firm*—Michael A. Mochinski

(57) ABSTRACT

A utensil cover lift and support apparatus for use with a cooking and food serving utensil fitted with a geometrically configured cover, the apparatus comprising a support fork assembly having a latch mechanism pivotally attached to a pair of elongate arms and a vertical support member situated in between the elongate arms and pivotally connected thereto and having an adjustable support block slidably connected thereto for engaging an outer lip inherently made part of the serving utensil, a lid bracket slidably mounted to the elongate arms and having at least two outwardly extending flanges integrally connected to a top plate situated therebetween, each of the flanges having a suction cup threadably mounted to an undersurface thereof for engaging the cover, and at least two suction cups mounted to the vertical support member to engage the serving utensil's sidewalls.

22 Claims, 6 Drawing Sheets

APPARATUS AND METHOD FOR LIFTING AND SUPPORTING A UTENSIL COVER

CROSS-REFERENCE TO RELATED APPLICATIONS

This application is a continuation-in-part application of my prior U.S. application Ser. No. 10/322,016, filed on Dec. 17, 2002 now U.S. Pat. No. 6,763,965, entitled "An Apparatus and Method for Lifting and Supporting a Utensil Cover".

FIELD OF THE INVENTION

The present invention relates in general to an apparatus made adaptable for use in lifting and supporting a cover typically made part of a combination cooking and food serving utensil such as a crock pot of the type commonly known in the art. More specifically, the present invention serves as means to efficiently and safely lift and support the cover from and over the cooking and food serving utensil in order to gain momentary access to comestible contents situated therein.

BACKGROUND OF THE INVENTION

Many homemakers as well as chefs utilize various utensils and appliances in the kitchen to assist in the preparation and service of food. A crock pot of the type commonly known in the art is an example of a combination kitchen utensil which purposefully cooks and warms food at a low temperature for a predetermined period of time. Given its desired capacity to slow cook and warm a modest amount of food, the crock pot is most notably used and observed at large gatherings, such as conferences, family meetings and so forth. To facilitate the cooking process and guard against heat-related injuries stemming from splattered foods, most cooking and food serving utensils comprise a top or cover made from glass or a semi-conductive material. The utensil cover, in most instances, is heavily weighted insofar to fit tightly atop a cylindrical-shaped, heat-equipped reservoir and is geometrically configured to resemble a dome or semi-flatten plate having a handle extending outwardly therefrom and integrally made part thereof.

During the cooking process as well as during moments of serving food, the homemaker or chef is periodically confronted with the requirement of removing the cover from the cooking and food serving utensil and locating a suitable location for the cover while one is gaining momentary access to the comestible contents. In order to alleviate this concern most effectively, the art provides for a range of cover handling devices. The most simplistic device comprises a pot handling glove or pad having insulating characteristics, while the more advanced device comprises a pot and pan lid holder of the type that can simultaneously engage the cover's handle and sidewall of the cooking utensil, such as the one described in U.S. Pat. No. 5,683,010 issued to Boyajian, Jr. Although this type of handling device still requires one to directly interact with and handle the cover, albeit at a modest level, it does facilitate placement of the cover about the utensil sidewall, thus suitably serving as a location for the cover.

In accordance with the present invention, applicant has appreciably devised an apparatus comprising means for lifting a cover while at rest atop the cooking and food serving utensil and supporting the cover at an inclined position for a momentary period of time insofar to gain access to the comestible contents, all of which can be accomplished without direct contact with the utensil cover.

BRIEF SUMMARY OF THE INVENTION

In order to overcome the numerous drawbacks apparent in the prior art, a utensil cover lift and support apparatus has been devised for use in residential and commercial food preparation and service settings.

It is thus an object of the present invention to provide a low cost, non-complicated utensil cover lift and support apparatus which may be reliably used in food preparation and service settings without undue modification of the cooking and food serving utensil.

It is another object of the present invention to provide such a utensil cover lift and support apparatus which affords one to access to the comestible contents in the cooking and food serving utensil without substantial interaction with and direct handling of the cover.

It is yet another object of the present invention to provide such a utensil cover lift and support apparatus which is capable of being washed and cleaned to the likes of other cooking utensils often used in a kitchen setting.

It is another object of the present invention to provide such a utensil cover lift and support apparatus which possesses the capacity to conform to a variety of cooking and food serving utensil shapes and configurations.

It is yet another object of the present invention to provide such a utensil cover lift and support apparatus which permits the return of condensed comestible contents collected on the cover back into the cooking and food serving utensil.

It is yet another object of the present invention to provide such a utensil cover lift and support apparatus which incorporates detachable means for easy removal from the cooking and food serving utensil.

It is yet another object of the present invention to provide such a utensil cover lift and support apparatus which accomplishes the foregoing and other objects and advantages and which is economical, durable, and fully effective in performing its intended functions.

In accordance with the present invention, a utensil cover lift and support apparatus has been devised for use with a cooking and food serving utensil generally present in a food preparation and service setting, the utensil cover lift and support apparatus comprising in combination a support fork assembly having a latch mechanism pivotally attached to a pair of elongate arms and a vertical support member selectively situated in between the two elongate arms and pivotally connected thereto and having an adjustable support block slidably connected thereto for engaging an outer lip made part of the cooking and food serving utensil, a lid bracket slidably mounted to the elongate arms and having at least two outwardly extending flanges integrally connected to a top plate situated therebetween, each of the outwardly extending flanges having a suction cup mounted to an undersurface thereof for engaging a utensil cover, and at least two suction cups mounted to the vertical support member to engage a sidewall of the cooking and food serving utensil, collectively serving to secure the utensil cover lift and support apparatus to the cooking and food serving utensil insofar to allow lifting and supporting of the cover to gain momentary access to comestible contents residing within the cooking and food serving utensil for completion of tasks of food preparation and service.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as an apparatus for lifting a cover from a cooking and food serving utensil while at rest thereon in order to gain access to comestible contents residing therein and supporting the cover for a momentary period of time until which time the cooking or serving task is complete.

Figure 1:
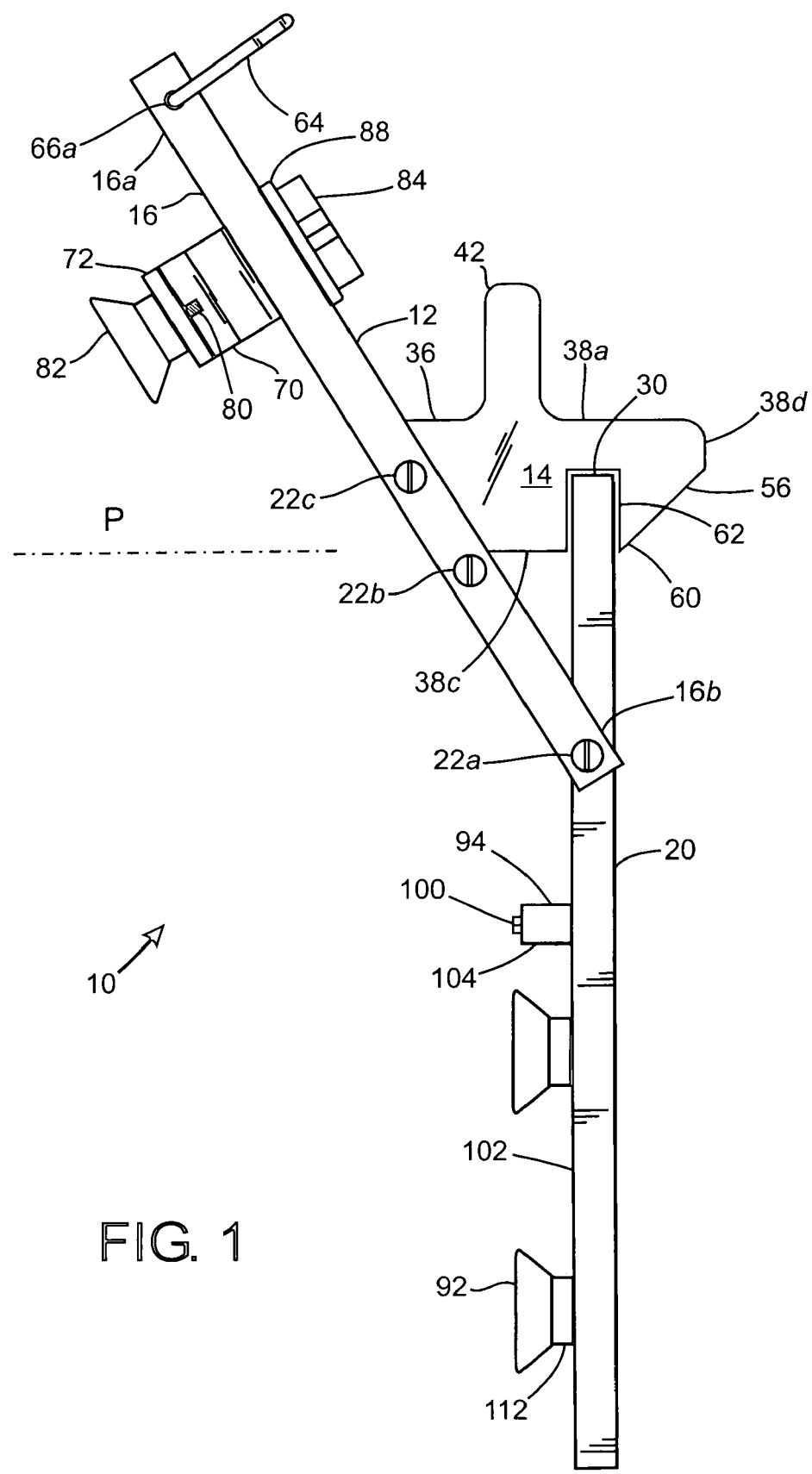
FIG. 1 is a side elevational view of a preferred embodiment of the present invention illustrating a fork support assembly in an upright position and engaging a top end of a vertical support member.
Figure 2:
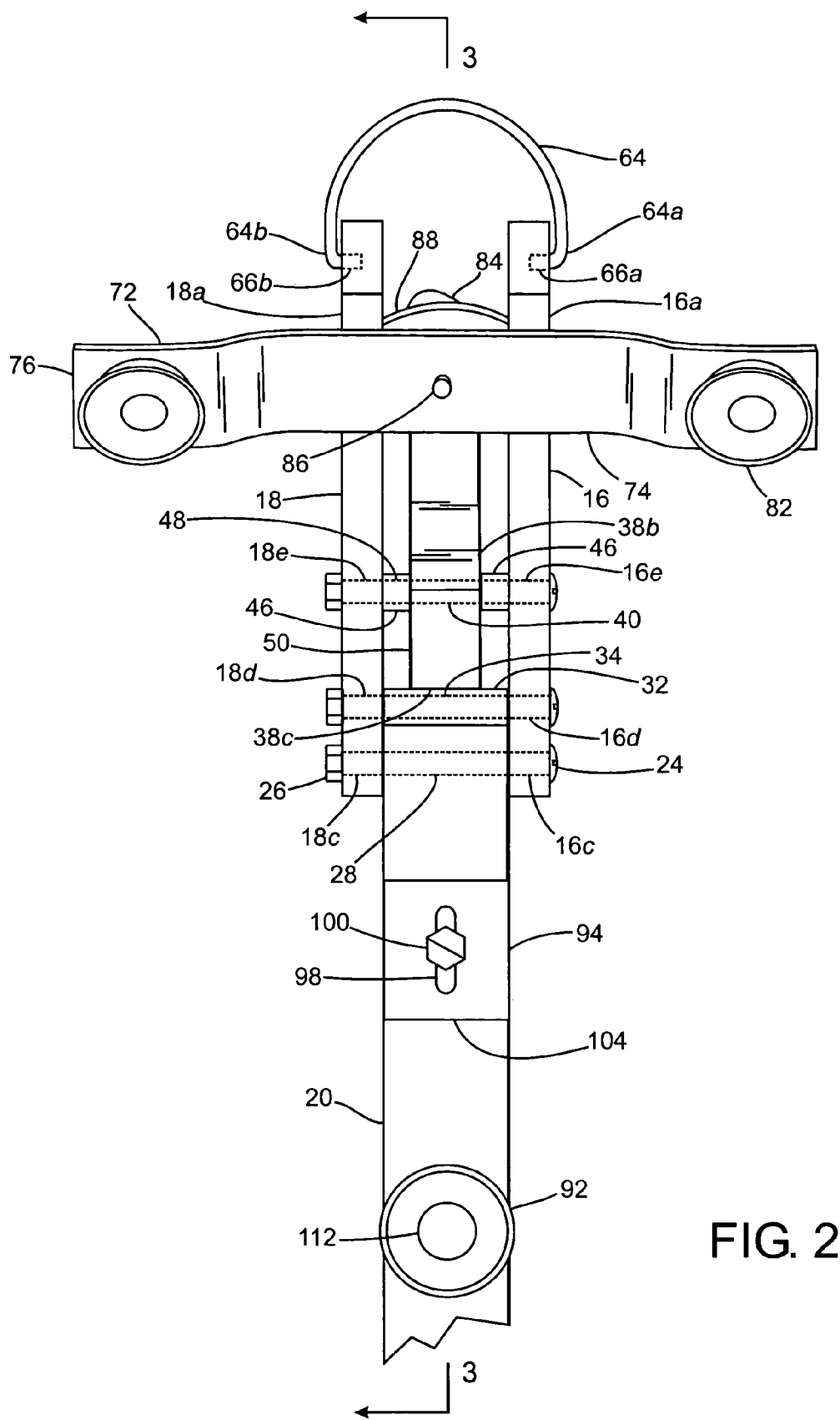
FIG. 2 is a partial front elevational view of the preferred embodiment of the present invention illustrating a fork support assembly in an upright position and engaging a top end of a vertical support member.
Figure 3:
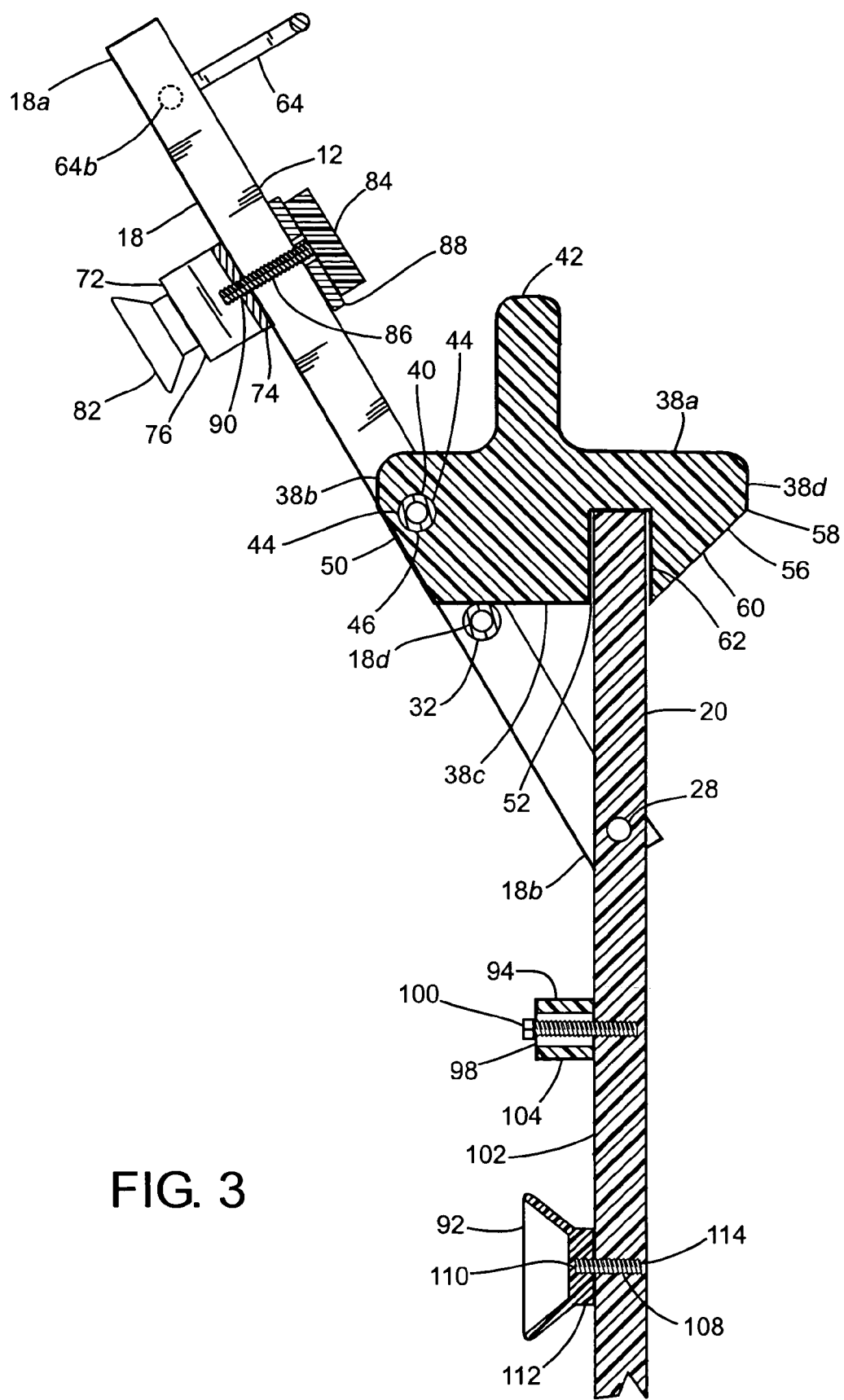
FIG. 3 is a side cross sectional view of the preferred embodiment of the present invention taken on line 3-3 of FIG. 2 illustrating a fork support assembly in an upright position and engaging a top end of a vertical support member.
Figure 4:
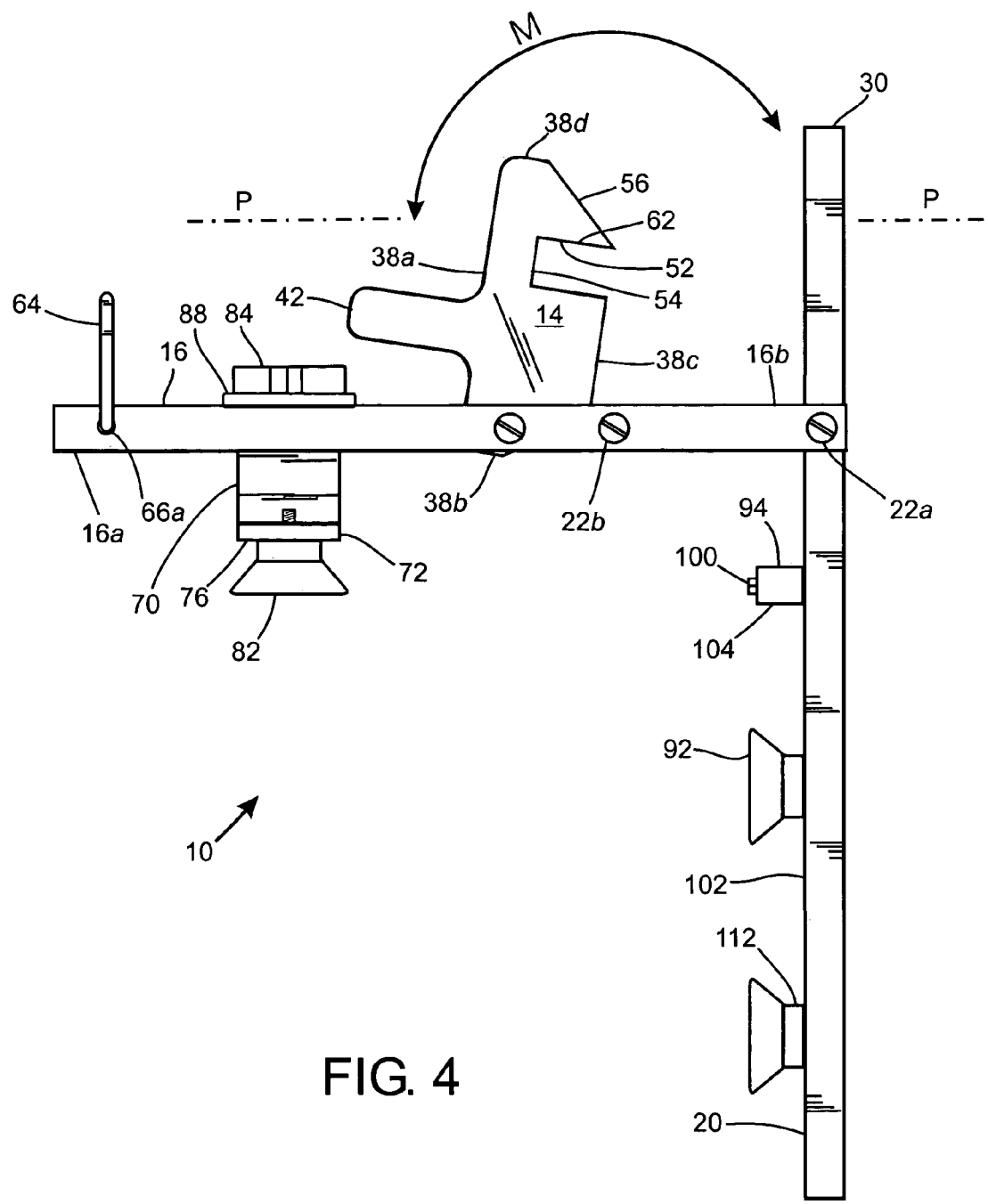
FIG. 4 is a side elevational view of the preferred embodiment of the present invention illustrating a latch mechanism disengaged from a vertical support member and a pair of elongate arms extending horizontal and parallel to axis P.

Referring now to FIG. 1, there is shown generally at 10 a utensil cover lift and support apparatus comprising a support fork assembly 12 having a latch mechanism 14 and a pair of elongate arms 16, 18 each being pivotally fastened to a vertical support member 20 and engaging a portion of the latch mechanism. In the preferred embodiment, each elongate arm 16, 18 comprises first and second ends 16a, 18a, 16b, 18b and at least three apertures (referred hereinafter as primary 16c, 18c, secondary 16d, 18d and tertiary 16e, 18e apertures) extending therethrough to permit passage of an equivalent number of fasteners 22a, 22b, 22c for holding together the elongate arms in a parallel arrangement and supporting the latch mechanism 14. Preferably, each fastener comprises a bolt 24 having a nut 26 threadably attached thereto which collectively serve to simplify construction of the support fork assembly. Although not explicitly stated herein, other fasteners of the type commonly known in the art may equally accomplish the same objective of holding together the elongate arms, such as an equivalent number of rivets by way of example. The primary aperture 16c, 18c of each elongate arm 16, 18 is preferably positioned at the second end 16b, 18b and primarily serves as the location for fastening each of the elongate arms to the vertical support member 20. As shown in FIGS. 2 and 3, the vertical support member comprises an aperture 28 having an equivalent diameter to that of the primary aperture and is positionally aligned therewith to permit passage of one of three bolts 22a used in the support fork assembly 12. Preferably, the vertical support member's aperture is located approximately one-third the distance from a top end 30 of the vertical support member in order to allow freedom of movement as the latch mechanism moves along path M, as shown in FIG. 4.

Referring now to FIGS. 2 and 3, the support fork assembly 12 further comprises an arm spacer 32 having a bore 34 extending lengthwise thereabout, with the bore having a diameter substantially equivalent to the diameter of the secondary aperture 16d, 18d of the elongate arm 16, 18. The arm spacer most notably assists in retaining the parallel positioning of each of the elongate arms 16, 18 and acts as a brace and catch for resting thereon a portion of the latch mechanism 14 while the latch mechanism is pivotally positioned away from the top end 30 of the vertical support member. In assembled form, the bore 34 of the arm spacer 32 is configurably positioned perpendicular to the latch mechanism and elongate arms and aligned with the secondary aperture 16d, 18d of each of the elongate arms to permit passage of a second fastener 22b of the three used for the support fork assembly 12, as best illustrated in FIG. 2.

The latch mechanism, as shown in FIG. 3, comprises a flatten plate 36 having four sides 38a, 38b, 38c, 38d and an aperture 40 extending therethrough for receiving a third fastener 22c of the three used for the support fork assembly 12. In the preferred embodiment, the first side 38a comprises a handle 42 extending outwardly therefrom in a perpendicular fashion and primarily serves as means to swing back-and-forth the latch mechanism 14 about a pivot point 44 primarily established at the aperture 40 located at and near the second side 38b. To maintain central positioning of the latch mechanism about the vertical support member 20 and in between the elongate arms to prevent frictional engagement therewith, the pivot point 44 comprises a pair of latch spacers 46 each having an elongate bore 48 extending lengthwise thereabout. As shown in FIG. 2, each arm spacer is adaptably fitted perpendicular to each side of the latch mechanism at and near the pivot point and positionally aligned with the latch mechanism's aperture 40 and the tertiary aperture 16e, 18e of each of the elongate arms 16, 18 insofar to permit passage of the third fastener 22c and establish the means by which the latch mechanism swingably moves and pivots about the pivot point 44. Located at and along the second side 38b of the latch mechanism is an angular edge 50 commencing at and near the aperture 40 and terminating at the third side 38c of the flatten plate 36, as best depicted in FIG. 1. The angular edge is geometrically configured to allow the latch mechanism to clear the arm spacer 32 for pivotal movement thereof and prevent the cover of the cooking and food serving utensil from interfering with the functioning of the latch mechanism 14, particularly during activities of lifting and supporting. The third side 38c of the latch mechanism comprises a cutout 52 having an abutting end 54 and a geometric configuration substantially corresponding to that of the top end 30 of the vertical support member 20, namely one that is rectangular in shape but proportionally sized to permit the first and second sides 38a, 38c of the latch mechanism to be substantially positioned parallel to a horizontal axis P, as illustrated in FIG. 1. Preferably upon engaging the latch mechanism 14 with that of the vertical support member, the abutting end 54 substantially mates with the top end, with the handle 42 being upwardly extended, generally in parallel alignment with the longitudinal axis of the vertical support member 20. This positioning is most notably apparent during use of the utensil cover lift and support apparatus 10 whereby the cover of the cooking and food serving utensil and elongate arms are collectively positioned at an incline, approximately 45° to horizontal axis P noted in FIG. 1. Conversely, the latch mechanism 14 upon release from the top end 30 will principally position the elongate arms 16, 18 in a perpendicular arrangement with that of the vertical support member 20, with the handle being outwardly positioned to extend away therefrom, as shown in FIG. 4. Similar to the second side 38b, the fourth side 38d of the flatten plate comprises a second angular edge 56 which commences at a point 58 substantially positioned along the fourth side and across from the aperture 40 of the latch mechanism and terminates at the third side 38c to form a protruding member 60 having one side 62 in common with that of the cutout 52.

Figure 5:
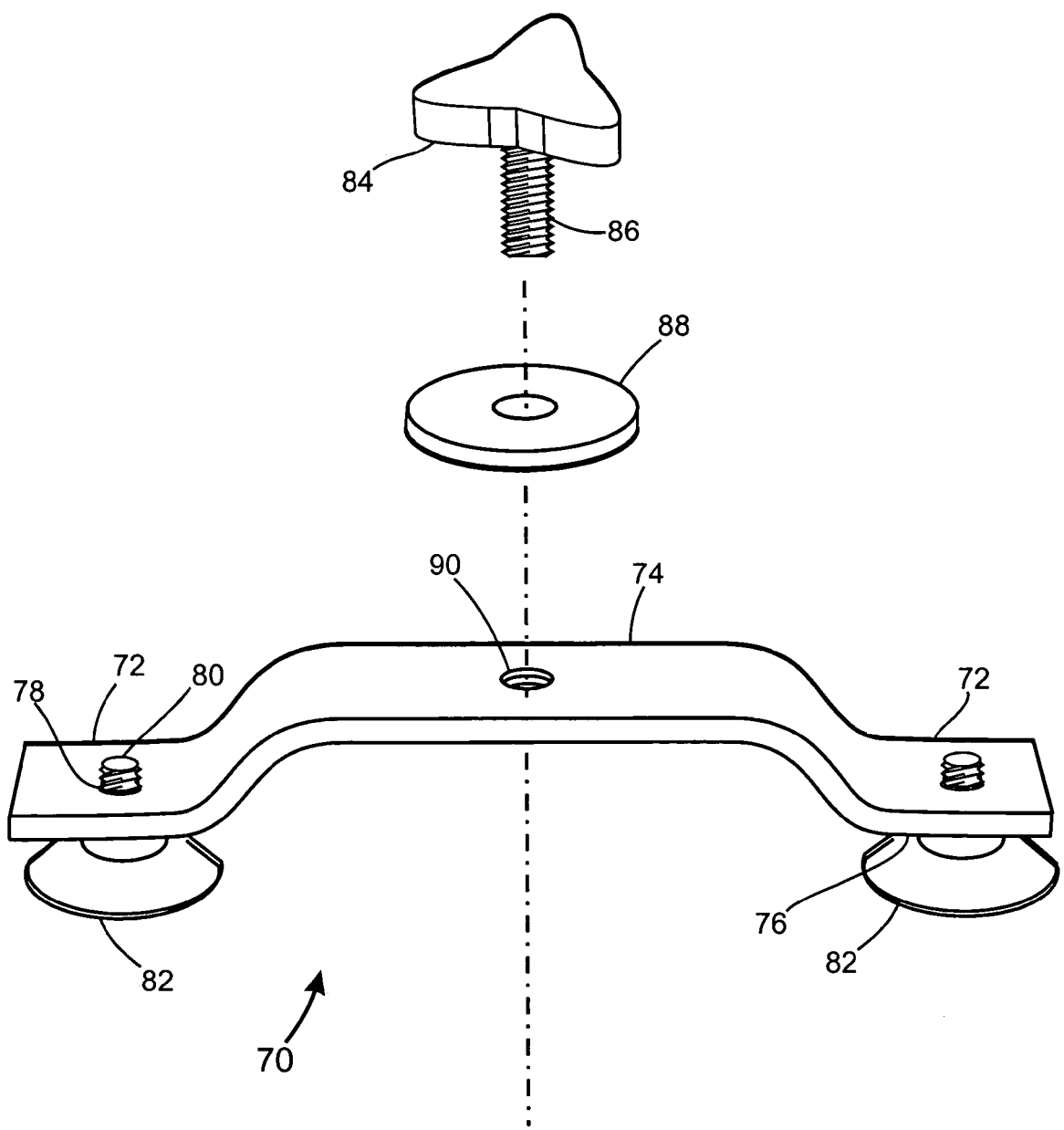
FIG. 5 is a front perspective view of the preferred embodiment of the present invention illustrating a lid bracket.

As means for handling the support fork assembly to ease lifting of the utensil cover from an at-rest position atop the cooking and food serving utensil, the elongate arms 16, 18 are adaptably fitted with a D-shaped ring 64 having two inwardly protruding ends 64a, 64b. Each protruding end is slidably situated in a depression 66a, 66b extending inwardly partway into each elongate arm to permit pivotal movement of the D-shaped ring thereabout. As depicted in FIG. 4, each depression is preferably located near the first end 16a, 18a of the elongate arm which suitably places the D-shaped ring in a position to gain the maximum amount of leverage needed to sufficiently lift the cover and place it in a supporting incline position. In addition to the presence of the D-shaped ring, the support fork assembly 12 further comprises means for mounting a utensil cover 68 to the elongate arms. As illustrated in FIG. 5, mounting means preferably comprises a lid bracket 70 having at least two outwardly extending flanges 72 integrally connected to a top plate 74 situated therebetween. Each extending flange comprises an undersurface 76 and a threaded aperture 78 for threadably receiving therethrough a threaded post 80 suitably made part of a suction cup 82 of the type readily known in the art to adhere to smooth, flat surfaces. Accordingly, each suction cup is fabricated from a rubberized material suitably possessing pliable characteristics to conform to the geometric contours of the utensil cover 68 insofar to ensure complete contact and adhesion thereto, particularly required during lifting and supporting of the utensil cover. As depicted in FIG. 5, each suction cup is situated at the undersurface of the extending flange, preferably positioned at the outer extremity of the lid bracket 70. To further ensure that the utensil cover is well supported during episodes of lifting and stationary positioning, the lid bracket is preferably mounted to the utensil cover along the diametric axis or width thereof and comprises a predetermined length to allow the suctions cups to fully engage and adhere to the utensil cover's exterior top surface. Although the lid bracket comprises a geometric configuration which accommodates most utensil cover shapes and contours, there may be instances where a shortened lid mount is most appropriate to ensure complete adhesion of the suction cups to the utensil cover, particularly a utensil cover comprising a smaller diameter and/or possessing substantial curvature. In other instances, the utensil cover's features, such as the handle or its height, may further limit proper placement of the lid bracket. In this instance, the extending flanges 72 may be distanced farther from the top plate to accommodate any notable obstruction to ensure that each of the suction cups engages the utensil cover. In limited applications, the extending flanges may be bent downwardly from the top plate 74 to increase the distance thereinbetween and angular orientation to correspond more appropriately with the contours of the utensil cover and accommodate the utensil cover's noted features. As shown in FIG. 5, a knob 84 having a threaded stem 86 fitted with a washer 88 and threadably inserted into a threaded aperture 90 extending through the top plate collectively serve as means for mounting the lid bracket to the elongate arms. To further this function, the washer preferably comprises an outer effective diameter substantially capable of bridging across the elongate arms 16, 18 and resting atop thereof without dropping down into and through the space formed by the parallel arrangement of the elongate arms. In addition to serving as means for mounting the lid bracket to the elongate arms, the knob further serves as a handling device and when cooperating with the functionality of the washer, the lid bracket can be slidably positioned about the support fork assembly 12 to accommodate a utensil cover having a differing diametric dimension.

Figure 6:
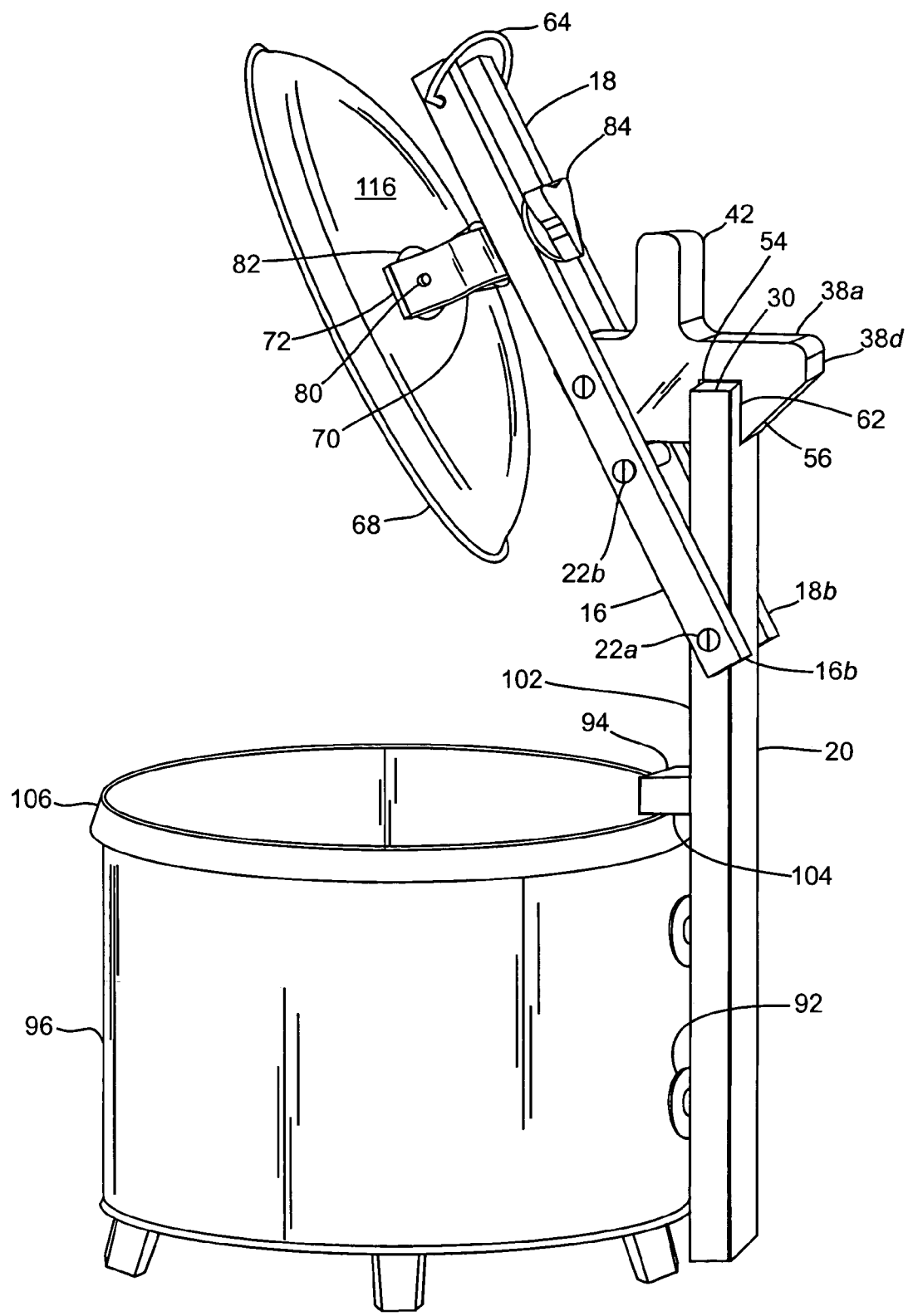
FIG. 6 is a perspective view of the preferred embodiment of the present invention illustrating a vertical support member attached to a cooking and food serving utensil and supporting a cover in an upright, incline orientation.

Referring now to FIG. 1, the vertical support member 20 further comprises means for attaching the utensil cover lift and support apparatus 10 to the cooking and food serving utensil insofar to accommodate the objectives stated herein, namely lifting and supporting the cover without direct contact therewith. Preferably, attaching means comprises at least two suction cups 92 and an adjustable support block 94, collectively configured to allow the vertical support member 20 to be situated alongside a sidewall 96 of the cooking and food serving utensil. The adjustable support block principally serves as means to prevent the vertical support member 20 from slipping downwardly as the support fork assembly 12 lifts and supports the cover of the cooking and food serving utensil. In order to accommodate the geometric configuration of the cooking and food serving utensil, most notably relating to the height thereof, the adjustable support block 94 comprises means for incremental adjustment about the vertical support member, namely a slot 98 extending lengthwise thereabout and a screw 100 threadably fitted therethrough to adaptably affix the support block to the vertical support member 20 at a predetermined location. Preferably, the support block is fastened to an inner facing side 102 of the vertical support member, specifically being mounted in such a fashion to extend outwardly therefrom and inward toward the centroid of the cooking and food serving utensil as shown in FIG. 6. Once the vertical support member is positionally placed near the sidewall of the cooking and food serving utensil insofar to allow a bottom portion 104 of the support block to engage an outer lip 106 extending circumferentially about the cooking and food serving utensil, the utensil cover lift and support apparatus 10 is prevented from moving downwardly along the longitudinal axis of the vertical support member. As illustrated in FIG. 6, each suction cup equally serve to secure the vertical support member 20 to the cooking and food serving utensil, most notably in preventing outward lateral movement of the utensil cover lift and support apparatus 10 from the sidewall of the cooking and food serving utensil. Like previously discussed for use with the lid bracket, each suction cup is fabricated from a pliable-rubberized material substantially capable of conforming to the sidewall of the cooking and food serving utensil. As depicted in FIG. 3, each suction cup is preferably mounted to the inner facing side 102 of the vertical support member using a threaded post 108 having one end 110 extending into a base 112 of the suction cup and a second end 114 threadably inserted into the vertical support member. In an alternative arrangement, one in which accommodates a larger than normal cooking and food serving utensil, the vertical support member may be fitted with more than two suction cups spatially positioned therealong to adhere to the sidewall 96 of the cooking and food serving utensil.

In operation, the utensil cover lift and support apparatus 10 is first configurably prepared for mounting on the cooking and food serving utensil. As illustrated in FIG. 4, the latch mechanism 14 is cocked forward insofar to disengage the cutout 52 from and top end 30 and clear the vertical support member 20. With the support fork assembly 12 positioned over the utensil cover, the lid bracket 70 is suitably placed within the approximate center of the utensil cover and pushed downwardly to allow each of the suction cups to sit flush and engage an exterior top surface 116 of the utensil cover 68. It is noted herein that the utensil cover lift and support apparatus 10 may be used with or without a utensil cover having a handle attached thereto, particularly of the type commonly associated with cooking utensils. After mounting the lid bracket to the utensil cover, the lid bracket is loosened from the elongate arms through manipulation of the knob and moved accordingly to accommodate the diametric dimensions of the utensil cover while providing adequate clearance for moving the vertical support member downwardly toward the sidewall of the cooking and food serving utensil. Once adequate clearance is notably apparent, the vertical support member 20 is further moved inward toward the sidewall of the cooking and food serving utensil to permit each of the suction cups 92 attached to the vertical support member to sit flush and engage therewith. After noting attachment of the utensil cover lift and support apparatus 10 to the cooking and food serving utensil, the D-shaped ring 64 is grasped and lifted upwardly therewith, particularly along path M noted in FIG. 4, until the latch mechanism 14 is within vicinity of the vertical support member. The cutout 52 is then configurably positioned atop the vertical support member 20 to permit the abutting end 54 to mate and engage with the top end 30 thereof.

It can be seen from the foregoing that there is provided in accordance with this invention a simple and easily operated device, which is particularly suitable for lifting and supporting a cover generally made part of the cooking and food serving utensil. The utensil cover lift and support apparatus 10 is completely functional in a variety of food preparation and service settings where periodic access to the comestible contents residing within the cooking and food serving utensil is required to complete tasks of food preparation and service and where space is limited for situating the cover nearby. It is obvious that the components comprising the utensil cover lift and support apparatus 10 may be fabricated from a variety of materials, providing such selection or use of materials possess the capacity to withstand forces acting thereon throughout its duration of use in a food preparation and service setting and withstand a moderate elevated temperature generally encountered during food preparation. Accordingly, it is most desirable, and therefore preferred, to construct the support fork assembly 12 and vertical support member 20 from a rigid material such as acrylic, Teflon®, nylon or polycarbonate, to name a few most readily available in the art. Aluminum, steel or an equivalent material possessing deformable characteristics while retaining strength collectively serve as suitable material types to construct the lid bracket 70 to ensure sustained and reliable use of the utensil cover lift and support apparatus 10.

While there has been shown and described a particular embodiment of the invention, it will be obvious to those skilled in the art that various changes and alterations can be made therein without departing from the invention and, therefore, it is aimed in the appended claims to cover all such changes and alterations which fall within the true spirit and scope of the invention.

What is claimed is:

1. An apparatus for lifting and supporting a cover being geometrically configured to fit atop a cooking utensil having an outer lip extending circumferentially thereabout, said apparatus comprising in combination:
   means for mounting a support fork assembly to the cover;
   a vertical support member pivotally attached to said support fork assembly and having a top end;
   means for attaching said vertical support member to the cooking utensil; and
   a latch mechanism pivotally attached to said support fork assembly for engaging said top end to selectively hold said support fork assembly at an incline position.

2. An apparatus as set forth in claim 1, further comprising an adjustable support block slidably connected below said top end to engage a portion of the outer lip, said adjustable support block having a slot extending longitudinally thereabout for receiving a screw threadably engaged to an inner facing side of said vertical support member insofar to allow said adjustable support block to incrementally move upwardly and downwardly thereabout to accommodate varying heights of the cooking utensil.

3. An apparatus as set forth in claim 1, wherein said attaching means comprises at least two suction cups fixedly attached to an inner facing side of said vertical support member.

4. An apparatus as set forth in claim 1, wherein said mounting means comprises a lid bracket having at least two outwardly extending flanges integrally connected to a top plate situated therebetween, each of said outwardly extending flanges having a suction cup threadably mounted to an undersurface thereof for engaging the cover.

5. An apparatus as set forth in claim 4, further comprising a knob having a threaded stem fitted with a washer and threadably inserted into a threaded aperture extending through said top plate to secure said lid bracket to said support fork assembly.

6. An apparatus as set forth in claim 1, wherein said support fork assembly comprises a pair of elongate arms configurably arranged on each side of said latch mechanism.

7. An apparatus as set forth in claim 6, wherein each of said elongate arms comprises primary, secondary and tertiary apertures extending therethrough for receiving a corresponding number of fasteners to steadily hold together said elongate arms in a parallel orientation.

8. An apparatus as set forth in claim 7, wherein said support fork assembly further comprises an arm spacer having a bore extending longitudinally thereabout configurably aligned with said secondary aperture of each of said elongate arms to slidably accept therethrough said fastener.

9. An apparatus as set forth in claim 7, wherein said support fork assembly further comprises a pair of latch spacers each having an elongate bore extending therethrough and selectively positioned perpendicular in between said elongate arm and said latch mechanism and configurably aligned with said tertiary aperture of said elongate arm and an aperture extending through said latch mechanism to allow pivotal movement thereabout.

10. An apparatus as set forth in claim 1, wherein said latch mechanism comprises a flatten plate having an aperture extending therethrough and first, second, third and fourth sides, said first side comprising a handle extending outwardly therefrom, perpendicular thereto for assisting in engaging and disengaging said latch mechanism to and from said top end of said vertical support member, said second side comprising an angular edge commencing near said aperture of said plate and terminating at said third side to provide unhindered movement of said latch mechanism, said third side comprising a cutout having an abutting end and a geometric configuration substantially equivalent to said top end of said vertical support member, said fourth side comprising a second angular edge commencing at a point substantially transverse from said aperture of said latch mechanism and terminating at said third side to form a protruding member having one side in common with that of said cutout.

11. An apparatus as set forth in claim 6, wherein each of said elongate arms comprises a depression extending inwardly partway near a first end thereof and a D-shaped ring having two inwardly protruding ends each being situated within said depression, said D-shaped ring being suitably placed in a position to gain the maximum amount of leverage needed to lift said support fork assembly with ease from an at-rest position.

12. A method for lifting and supporting a cover being geometrically configured to fit atop a cooking utensil having an outer lip extending circumferentially thereabout, said method comprising the steps of:
    situating alongside the cooking utensil a vertical support member having a top end and an adjustable support block slidably affixed therebelow for engaging a portion of the outer lip;
    mounting to an inner facing side of said vertical support member at least two suction cups to engage a sidewall of the cooking utensil to tighteningly hold said vertical support member in a vertical orientation;
    connecting a pair of elongate arms to said vertical support member and situating in between said elongate arms and pivotally attaching thereto a latch mechanism having means for engaging said top end of said vertical support member; and
    attaching to the cover a lid bracket having at least two outwardly extending flanges integrally connected to a top plate situated therebetween, each of said outwardly extending flanges having a suction cup threadably mounted to an undersurface thereof for engaging an exterior top surface of the cover, said top plate comprising a threaded aperture extending therethrough for threadably receiving a threaded stem of a knob to tighteningly secure said lid bracket to said elongate arms.

13. A method as set forth in claim 12, wherein said engaging means comprises a cutout formed from out of a third side of said latch mechanism and having an abutting end and a geometric configuration substantially equivalent to said top end of said vertical support member.

14. A method as set forth in claim 12, wherein each of said elongate arms comprises a depression extending inwardly partway near a first end thereof and a D-shaped ring having two inwardly protruding ends each being situated within said depression, said D-shaped ring being suitably placed in a position to gain the maximum amount of leverage needed to lift said support fork assembly with ease from an at-rest position.

15. An apparatus for lifting and supporting a cover being geometrically configured to fit atop a cooking utensil having an outer lip extending circumferentially thereabout, said apparatus comprising in combination:
    a vertical support member having a top end and an adjustable support block slidably affixed therebelow for engaging a portion of the outer lip;
    at least two suction cups fixedly attached to an inner facing side of said vertical support member;
    a support fork assembly having a pair of elongate arms each having an end pivotally attached to said vertical support member and a latch mechanism situated in between and pivotally attached to said elongate arms collectively allowing said support fork assembly to pivot about said vertical support member to selectively hold the cover at an incline position; and
    a lid bracket having at least two outwardly extending flanges integrally connected to a top plate situated therebetween, each of said outwardly extending flanges having a suction cup threadably mounted to an undersurface thereof for engaging the cover, said top plate comprising a threaded aperture for receiving therethrough a threaded stem of a knob to tighteningly secure said lid bracket to said elongate arms.

16. An apparatus as set forth in claim 15, wherein said threaded stem is fitted with a washer having an outer effective diameter substantially capable of bridging across said elongate arms.

17. An apparatus as set forth in claim 15, wherein each of said elongate arms comprises a depression extending inwardly partway near a first end thereof and a D-shaped ring having two inwardly protruding ends each being situated within said depression, said D-shaped ring being suitably placed in a position to gain the maximum amount of leverage needed to lift said support fork assembly with ease from a static position.

18. An apparatus as set forth in claim 15, wherein said latch mechanism comprises a flatten plate having an aperture extending therethrough and first, second, third and fourth sides, said first side comprising a handle extending outwardly therefrom, perpendicular thereto for assisting in engaging and disengaging said latch mechanism to and from said top end of said vertical support member, said second side comprising an angular edge commencing near said aperture of said flatten plate and terminating at said third side to provide unhindered movement of said latch mechanism, said third side comprising a cutout having an abutting end and a geometric configuration substantially equivalent to said top end of said vertical support member, said fourth side comprising a second angular edge commencing at a point substantially transverse from said aperture of latch mechanism and terminating at said third side to form a protruding member having one side in common with that of said cutout.

19. An apparatus as set forth in claim 15, wherein each of said elongate arms comprises primary, secondary and tertiary apertures extending therethrough for receiving a corresponding number of fasteners to steadily hold together said elongate arms in a parallel orientation.

20. An apparatus as set forth in claim 19, wherein said support fork assembly further comprises an arm spacer having a bore extending longitudinally thereabout configurably aligned with said secondary aperture of each of said elongate arms to slidably accept therethrough said fastener.

21. An apparatus as set forth in claim 19, wherein said support fork assembly further comprises a pair of latch spacers each having an elongate bore extending therethrough and suitably positioned perpendicular in between said elongate arms and said latch mechanism and configurably aligned with said tertiary aperture of elongate arm and an aperture extending through said latch mechanism to allow pivotal movement thereabout.

22. An apparatus as set forth in claim 15, wherein said elongate arms, latch mechanism and vertical support member are collectively fabricated from polycarbonate.

* * * * *